US009170086B1

(12) United States Patent
Youngquist et al.

(10) Patent No.: US 9,170,086 B1
(45) Date of Patent: Oct. 27, 2015

(54) INDUCTIVE POSITION SENSOR

(71) Applicant: The United States of America as Represented by the Administrator of the National Aeronautics and Space Administration, Washington, DC (US)

(72) Inventors: Robert C. Youngquist, Cocoa, FL (US); Stephen M. Simmons, Melbourne, FL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 18 days.

(21) Appl. No.: 14/150,502

(22) Filed: Jan. 8, 2014

Related U.S. Application Data

(63) Continuation-in-part of application No. 12/961,344, filed on Dec. 6, 2010, now abandoned.

(60) Provisional application No. 61/267,130, filed on Dec. 7, 2009.

(51) Int. Cl.
| | | |
|---|---|---|
| G01B 7/14 | (2006.01) | |
| G01B 7/30 | (2006.01) | |
| G01D 5/20 | (2006.01) | |

(52) U.S. Cl.
CPC .. *G01B 7/14* (2013.01); *G01B 7/30* (2013.01); *G01D 5/2046* (2013.01); *G01D 5/2086* (2013.01)

(58) Field of Classification Search
CPC ..... G01D 5/2046; G01D 5/2086; G01B 7/14; G01B 7/30
USPC ........................................ 324/207.16, 207.17
See application file for complete search history.

(56) References Cited

U.S. PATENT DOCUMENTS

| | | | |
|---|---|---|---|
| 3,178,696 A | | 4/1965 | Claftin, Jr. |
| 5,617,023 A | | 4/1997 | Skalski |
| 5,841,273 A | * | 11/1998 | Muraji ..................... 324/207.17 |
| 6,384,597 B1 | * | 5/2002 | Irle et al. .................. 324/207.17 |

\* cited by examiner

*Primary Examiner* — Melissa Koval
*Assistant Examiner* — Daniel Miller
(74) *Attorney, Agent, or Firm* — Michelle L. Ford; Peter J. Van Bergen

(57) ABSTRACT

An inductive position sensor uses three parallel inductors, each of which has an axial core that is an independent magnetic structure. A first support couples first and second inductors and separate them by a fixed distance. A second support coupled to a third inductor disposed between the first and second inductors. The first support and second support are configured for relative movement as distance changes from the third inductor to each of the first and second inductors. An oscillating current is supplied to the first and second inductors. A device measures a phase component of a source voltage generating the oscillating current and a phase component of voltage induced in the third inductor when the oscillating current is supplied to the first and second inductors such that the phase component of the voltage induced overlaps the phase component of the source voltage.

17 Claims, 4 Drawing Sheets

INDUCTIVE POSITION SENSOR

CROSS-REFERENCE TO RELATED APPLICATIONS

This application is a continuation-in-part of U.S. application Ser. No. 12/961,344, filed Dec. 6, 2010, which claims benefit under 35 U.S.C. §119(e) of U.S. Provisional Application Ser. No. 61/267,130, filed on Dec. 7, 2009, the contents of which are incorporated herein by reference.

ORIGIN OF INVENTION

The invention described herein was made in the performance of work under a NASA contract and by an employee of the United States Government and is subject to the provisions of Public Law 96-517 (35 U.S.C. §202) and may be manufactured and used by or for the Government for governmental purposes without the payment of any royalties thereon or therefore.

BACKGROUND OF THE INVENTION

1. Field of the Invention

The present invention is directed to position sensors, and more particularly to an inductive position and tilt sensor using three parallel inductors coupled to drive and measurement devices to achieve null point compensation.

2. Description of Related Art

A variety of position sensors are known in the art. Examples include capacitance-based position sensors, laser-based position sensors, eddy-current sensing position sensors, and linear displacement transducer-based position sensors. While each type of position sensor has its advantages, each also presents disadvantages for some applications. For example, the size of capacitors can make their use impractical when the position sensor must be small in size. The same is true for linear displacement transducers. The complexity and/or cost of laser-based sensors and eddy-current-based sensors can negate their advantages in a number of applications.

BRIEF SUMMARY OF THE INVENTION

The present invention is directed to an inductive position sensor that uses three inductors, each of which has an axial core that is an independent magnetic structure. A first support is coupled to a first inductor and a second inductor for separating them by a fixed distance with a respective first axial core and second axial core maintained parallel to one another. A second support is coupled to a third inductor for disposing it between the first and second inductor with the third inductor's axial core maintained parallel to the first and second axial cores. The first, second and third inductors are immersed in a common medium, such as air, wherein the three inductors are inductively coupled through the common medium. The first support and second support are configured for relative movement therebetween wherein the first axial core, second axial core, and third axial core remain parallel to one another during such relative movement as distance changes from the third inductor to each of the first inductor and second inductor. A source supplies an oscillating current to the first inductor and second inductor via a first electrical conductor arrangement so that a polarity of the oscillating current supplied to the first inductor is opposite to a polarity of the oscillating current supplied to the second inductor. A device coupled to the source measures a phase component of the oscillating current. The device is further coupled to the third inductor via a second electrical conductor arrangement for measuring a phase component of voltage induced in the third inductor when the oscillating current is supplied to the first inductor and second inductor so that the phase component of the voltage induced is approximately equal to the phase component of an oscillating voltage used to generate the oscillating current. The first electrical conductor arrangement and second electrical conductor arrangement have fixed capacitance therebetween during the relative movement between the first and second supports.

BRIEF DESCRIPTION OF THE DRAWINGS

The features and advantages of the present invention will become apparent from the following detailed description of a preferred embodiment thereof, taken in conjunction with the accompanying drawing, in which.

DETAILED DESCRIPTION OF THE INVENTION

Figure 1:
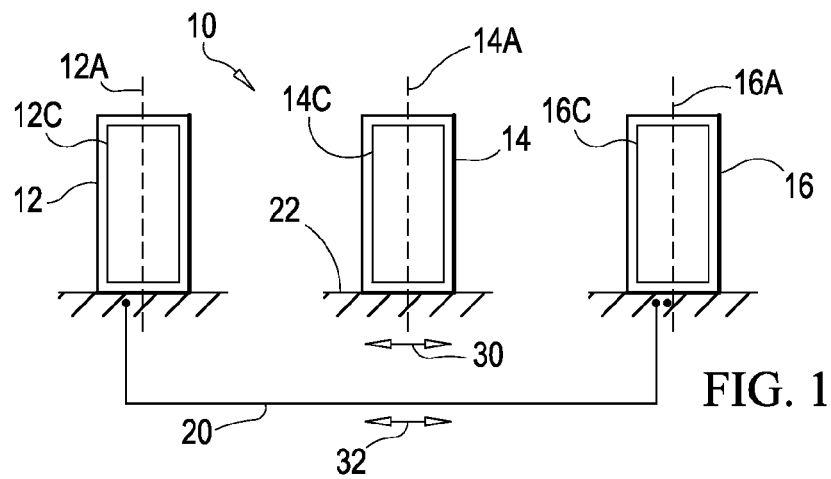
FIG. 1 is a schematic view of three inductors used in an inductive position sensor in accordance with an embodiment of the present invention.

Referring now to the drawings and more particularly to FIG. 1, an inductive position sensor in accordance with an embodiment of the present invention is shown and is referenced generally by numeral 10. For clarity of illustration, only the mechanical aspects of three inductors used in inductive position sensor 10 are illustrated in FIG. 1. The electrical and other construction aspects in various embodiments of inductive position sensor 10 will be presented later herein.

Inductive position sensor 10 uses spaced-apart and adjacent inductors 12, 14, and 16. For purposes of the present invention, each of inductors 12, 14, and 16 is an independent inductor structure defined by a coil of wire (not shown) wrapped about its own separate and mechanically independent ferromagnetic core 12C, 14C, and 16C, respectively, in accordance with constructions well known and understood in the art. That is, each of magnetic cores 12C, 14C, and 16C is an individual magnetic structure. The inductors used in the present invention are cylindrical type inductors and are not torroidal inductors. The inductors' coils are omitted from the figures for clarity of illustration. However, as is also well known and understood in the art, an imaginary axis extending through a cylindrical inductor's ferromagnetic core wrapped by its coil defines an inductor's longitudinal axis that is referenced in each inductor 12, 14, and 16 by a dashed line 12A, 14A, and 16A, respectively. In accordance with the present invention, inductors 12, 14, and 16 are positioned such that their longitudinal axes 12A, 14A, and 16A are parallel to one another and lie within a common plane, e.g., the plane of the paper in the illustrated example.

Each of inductors 12, 14, and 16 is an independent inductor structure in that no magnetic material is shared by the inductors. That is to say, any inductive coupling of magnetic fields associated with each of inductors 12, 14, and 16 occurs only through the medium (e.g., air) in which inductors 12, 14, and 16 are immersed. This greatly simplifies construction of position sensor 10 since conventional off-the-shelf inductors can be used.

The outermost inductors 12 and 16 are mechanically fixed in their relationship to one another by, for example, a support 20 that can be a specially-designed support or can be part of an object (not shown) whose position is to be sensed by sensor 10. Inductor 14 disposed between inductors 12 and 16 can be mechanically coupled to a support 22 that can be a specially-designed support or can be part of an object (not shown) whose position is to be sensed by sensor 10. Supports 20 and 22 are configured for one-dimensional relative movement therebetween such that inductor 14 experiences relative movement with respect to the combination of inductors 12 and 16. Accordingly, support 20 could be stationary and support 22 could be configured for one-dimensional movement in the common plane defined by axes 12A, 14A, and 16A as indicated by two-headed arrow 30. Alternatively, support 22 could be stationary and support 20 could be configured for one-dimensional movement in the common plane defined by axes 12A, 14A, and 16A as indicated by two-headed arrow 32.

The above-described mechanical aspects of inductive position sensor 10 are incorporated with electrical features and additional construction features to provide position sensing capability. The basic features of two possible electrical connection scenarios will be described with the aid of FIGS. 2 and 3. For clarity of illustration, the above-described mechanical aspects are not illustrated in FIGS. 2 and 3. However, it is to be understood that these mechanical aspects are included in the electrical connection scenarios depicted in FIGS. 2 and 3.

Figure 2:
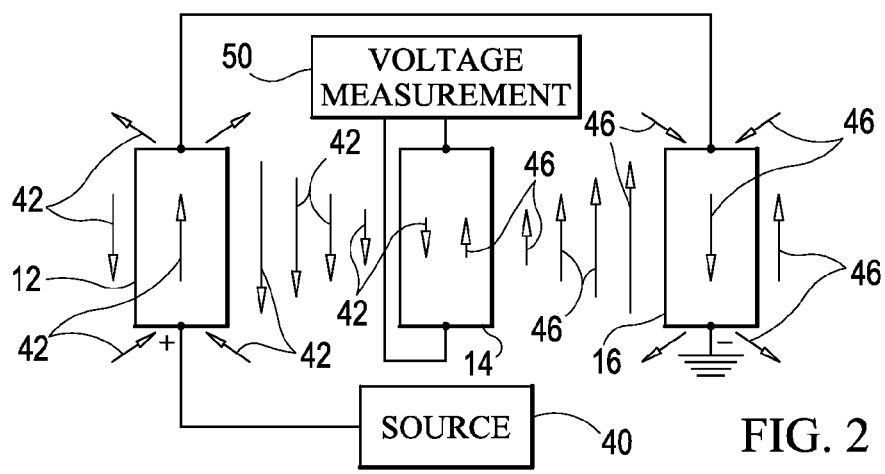
FIG. 2 is a schematic view of the inductive position sensor with current source and voltage measurement devices coupled thereto in accordance with an embodiment of the present invention.

Referring first to FIG. 2, a source 40 of an oscillating electric current is electrically coupled to the outermost inductors 12 and 16 so that they function as drive inductors. More specifically, the electric current supplied to inductor 12 is of opposite polarity to that supplied to inductor 16. By way of example, source 40 can be an oscillating voltage source that is used to generate a corresponding oscillating current when the voltage is applied to an electric circuit that includes inductors 12 and 16. While source 40 is representative of one or more sources, the oscillating current supplied to inductors 12 and 16 should be of the same magnitude and phase. As a result, magnetic fields are produced by inductors 12 and 16, and extend across the gap between inductors 12 and 16. The magnetic field between inductors 12 and 14 is primarily produced by inductor 12 and is referenced by magnetic field lines 42, while the magnetic field between inductors 14 and 16 is primarily produced by inductor 16 and is referenced by magnetic field lines 46. Magnetic fields 42 and 46 decrease in a non-linear fashion with distance from respective axes 12A and 16A as would be understood in the art.

In the FIG. 2 embodiment, inner inductor 14 is the pick-up inductor coupled to a voltage measurement device 50 (e.g., meter, oscilloscope, etc.) capable of measuring voltage induced in inductor 14 based on its position relative to drive inductors 12 and 16. That is, the induced voltage and its polarity are indicative of the relative position of inductor 14 as compared to inductors 12 and 16. While the drop-off in each of magnetic fields 42 and 46 is non-linear, tests of the present invention have yielded the unexpected result that the voltage induced in inductor 14 is highly linear as the air (or other media of immersion) gaps between inductor 14 and inductors 12 and 16 change. This linear response minimizes output processing requirements as a simple voltage measurement indicates the relative positions of inductors 12, 14, and 16. Furthermore, a linear response means that the resolution of the sensor will be approximately constant regardless of the position of inductor 14 relative to the combination of inductors 12 and 16. This will be true regardless of whether inductor 14 moves relative to inductors 12 and 16, or the fixed-relationship combination of inductors 12 and 16 moves relative to inductor 14.

Figure 3:
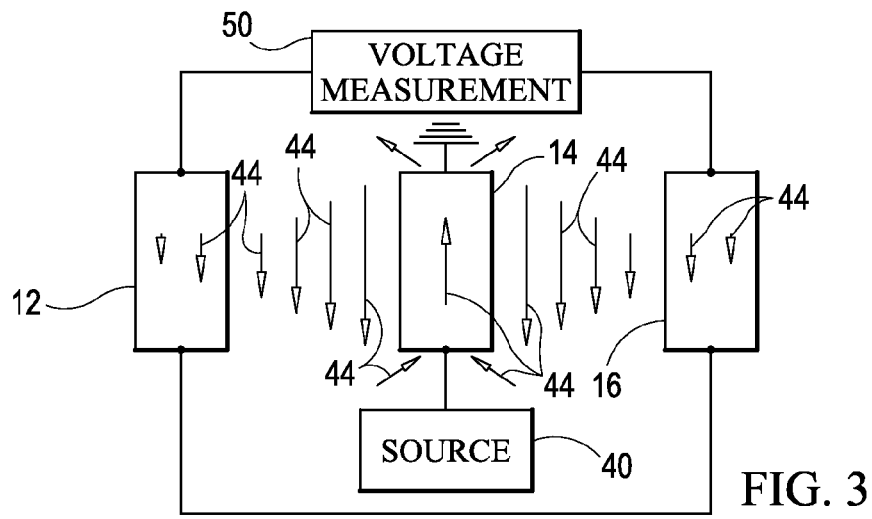
FIG. 3 is a schematic view of the inductive position sensor with current source and voltage measurement devices coupled thereto in accordance with another embodiment of the present invention.

Another electrical connection scenario for the present invention is presented in FIG. 3 where source 40 supplies an oscillating current to just inner inductor 14 while voltage measurement device 50 is coupled to outer inductors 12 and 16. In this embodiment, a magnetic field 44 is produced by inductor 14. Voltage measurement device 50 is coupled to inductors 12 and 16 such that induced voltage of one polarity is measured at inductor 12, whereas the induced voltage of an opposing polarity is measured at inductor 16. The magnitudes of the measured voltages are indicative of the position of inductor 14 relative to inductors 12 and 16. Voltage measurement device 50 can be realized by a single device or two separate devices without departing from the scope of the present invention.

The cylindrical inductors used in the various embodiments of the present invention can be of any conventional design, e.g., standard cylindrical, dumb-bell shaped, etc. Their physical size and inductance can be selected to satisfy the requirements of a particular application. In general, the frequency of the supplied oscillating current should be large enough such that the impedance of the current-driven inductor(s) is large compared to their total resistance. Further, for best sensitivity, the inductor(s) serving as the voltage measurement or pick-up inductors should be (magnetically) unshielded inductors. Of course, all three of the inductors could be unshielded. The outermost inductors 12 and 16 (or all three inductors) can be, but need not be, identical in terms of their inductance value (to within normal/acceptable tolerances) in order to simplify drive and/or measurement electronics. However, it is to be understood that the present invention could be practiced using inductors 12 and 16 having different inductance values, although this may require adjustments in one or more of drive currents, inductor core materials, etc., to make the ultimate position sensor perform as needed.

When measuring small positive/negative amounts of position change relative to a starting or null position, the inductive position sensor of the present invention must pass through a clearly defined null point. The problem of null point clarity, and the solutions to this problem provided by the present invention, will be explained for the embodiment illustrated in FIGS. 1 and 2 where the center inductor 14 is the pick-up inductor. As explained above, the magnetic fields produced by the two outer drive inductors vary linearly with position, ideally passing through a zero or null point. However, this null point may not be stable (and may not even exist for some signal processing methods) as the center inductor is moved back and forth. The lack of a clearly defined zero or null point is particularly important for applications that require knowledge of a "home" location (i.e., typically the zero point).

The cause of the unstable or missing null point is due to the presence of electric and magnetic fields at the center inductor that are not in temporal phase with the magnetic fields generated by the outer drive inductors coupled with the choice of signal processing method. For the inductive position sensor, this result is brought about by two characteristics of the three inductor sensor. First, the center inductor is coupled to the outer inductors not only through the magnetic fields they generate, but also through the electric fields that they generate. In other words, they are not only inductively coupled, but capacitively coupled. When voltages are applied to the outer inductors causing current to flow, the voltages generate electric fields and the center inductor responds to those electric fields by generating a small voltage of its own. Secondly, the presence of any conductors in the area around the drive inductors can generate eddy currents that affect the magnitude and phase of the primary magnetic fields. When an oscillating magnetic field sees a conductor, the free electrons in the conductor move in an attempt to cancel the field. This will not only reduce the magnetic field, but can cause a phase shift in the remaining magnetic field.

To summarize, the capacitive and eddy current effects add alternating signals to the center inductor that are not in temporal phase with the primary magnetic signal. Depending on the signal processing method used, these two effects cannot be canceled by simply translating the center inductor as there will always be a signal generated by the center inductor that prevents a null point from being clearly defined.

Figure 4:
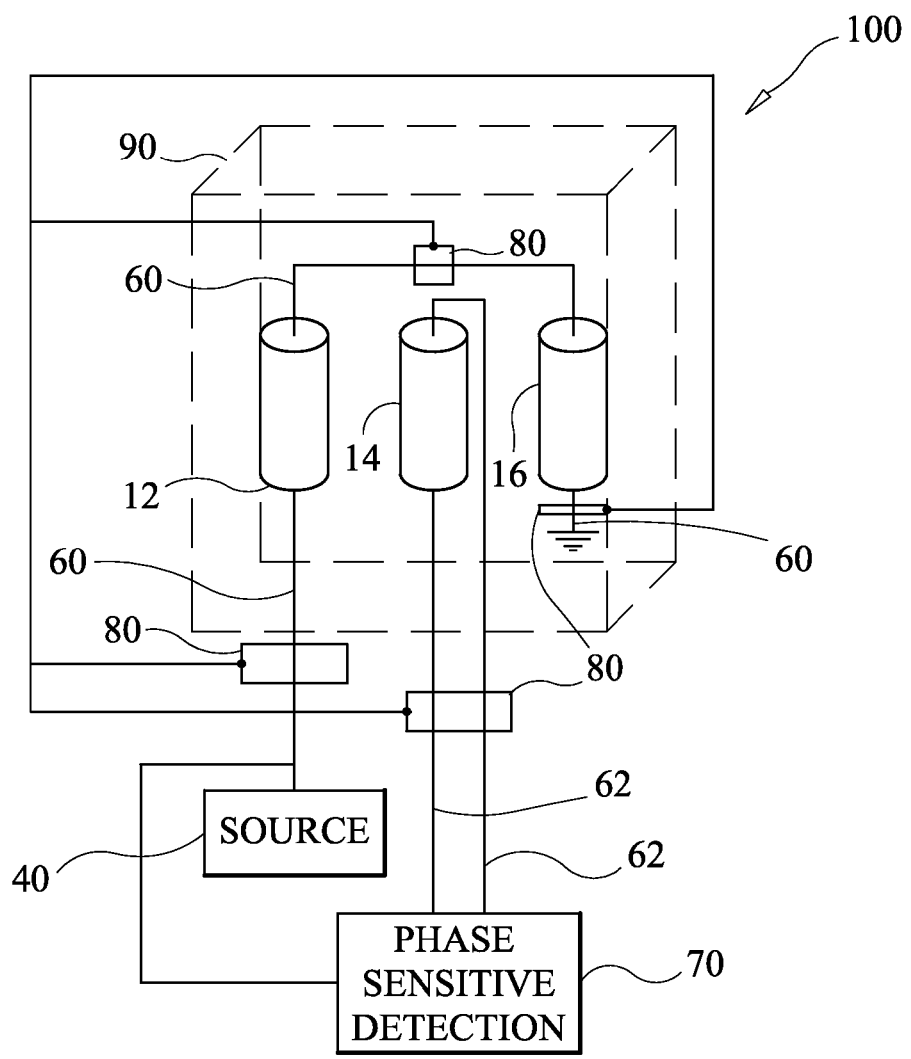
FIG. 4 is a schematic view of the inductive position sensor configured with null point compensation in accordance with an embodiment of the present invention.

To compensate for the missing null point, the inductive position sensor of the present invention employs certain construction and processing details. Briefly, the inductive position sensor is constructed so that capacitance between the electrical conductors coupled to the inductors is minimized or at least fixed during relative movement between the inner pick-up inductor and the outer drive inductors, and so that outside magnetic fields do not affect the inductors. In terms of processing, tests of the present invention showed that an absolute zero or null point can be observed by restricting voltage measurement to a single phase component of the pick-up inductor's output signal that overlaps with a single phase component of the oscillating voltage used in the generation of the oscillating current applied to the drive inductors. An inductive position sensor embodying these construction and processing principles is illustrated schematically in FIG. 4 and is referenced generally by numeral 100.

Sensor 100 includes leads 60 coupling source 40 to drive inductors 12 and 16 in order to support the application of an oscillating drive current thereto as explained above. Leads 62 couple pick-up inductor to a measurement device that, in this embodiment, is a phase sensitive detection device 70. The oscillating voltage output of source 40 (used to generate the oscillating drive current for inductors 12 and 16) is also provided to phase sensitive detection device 70. To fix and/or minimize capacitance between leads 60 and 62 and the inductors, leads 60 and 62 are maintained in fixed relationships as indicated schematically by a lead support 80 that can be implemented in a variety of ways without departing from the scope of the present invention. In addition to fixing positions of leads 60 and 62, lead support 80 can be configured to capacitively isolate leads 60 from leads 62 (e.g., create lead "paths" that do not overlap, provide shielding of the leads, etc.). This will allow sensor 100 to be calibrated for its inherent capacitance effects that will then remain constant during relative movement of the sensor's pick-up inductor 14. Additionally, a magnetic material housing (e.g., mu-metal housing) 90 could be used to encase inductors 12, 14, and 16 to prevent the sensor's magnetic fields from interacting with nearby metal objects. The interaction with these metal objects causes the magnetic field to change phase and amplitude thereby shifting the null point. The use of a mu-metal shield will minimize this source of instability thereby allowing the null point to remain in a fixed "location" between the drive inductors.

As mentioned above, the signal processing should be done by choosing a phase component of the drive signal from source 40 that overlaps substantially with a phase component of the output signal generated by pick-up inductor 14. The selected phase component will change phase as the pick-up inductor is moved back and forth thereby identifying/locating a zero or null point. This point will be due, not only to the magnetic fields generated by the drive inductors 12 and 16, but also by eddy current and capacitive effects. However, if these effects are stable (during relative movement of pick-up inductor 14) owing to the above-described construction constraints, then these effects will manifest as offsets and slope changes and the sensor will operate as a highly sensitive position sensor with a well-defined null point.

Figure 5:
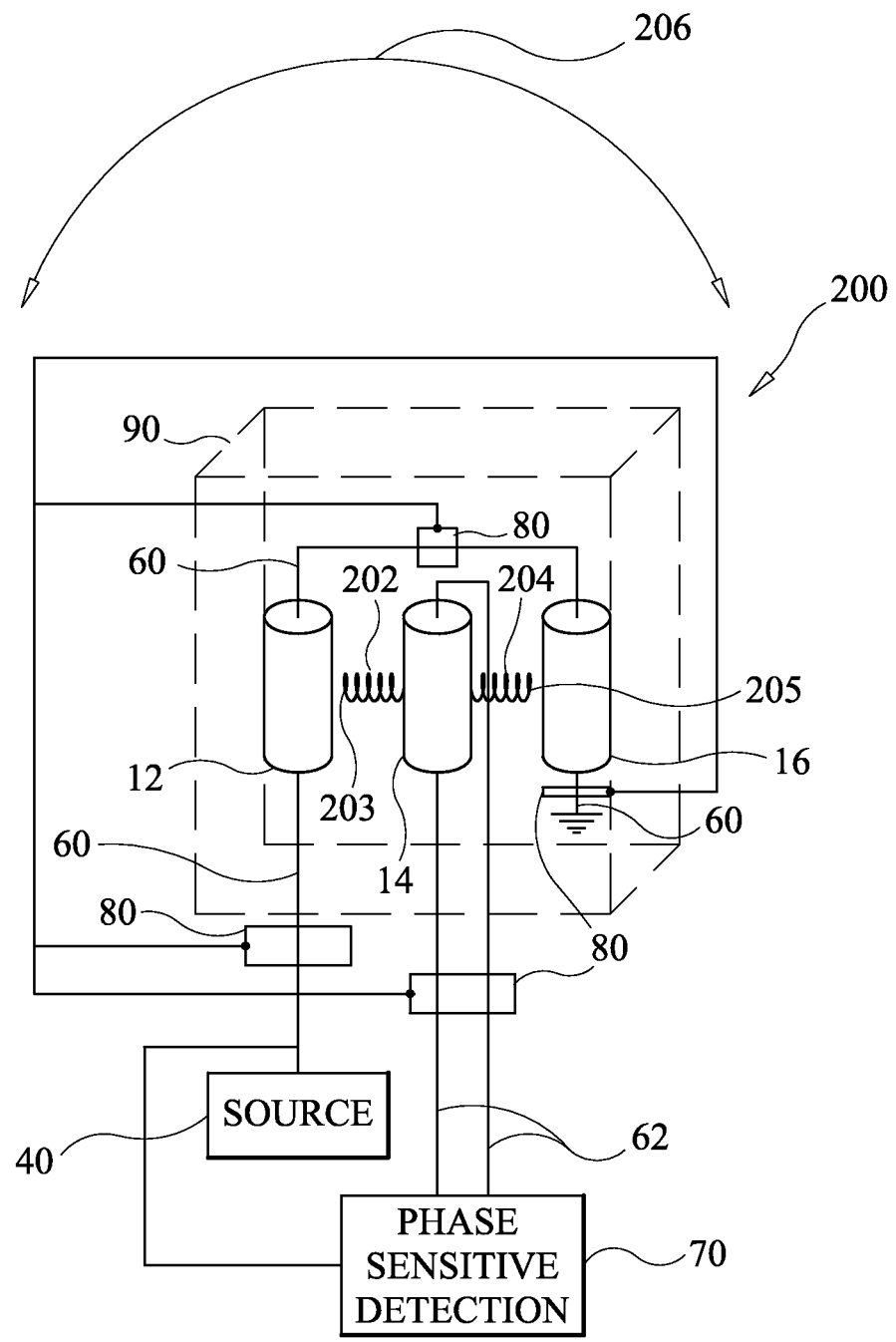
FIG. 5 is a schematic view of an inductive tilt sensor configured with null point compensation in accordance with an embodiment of the present invention.
Figure 6:
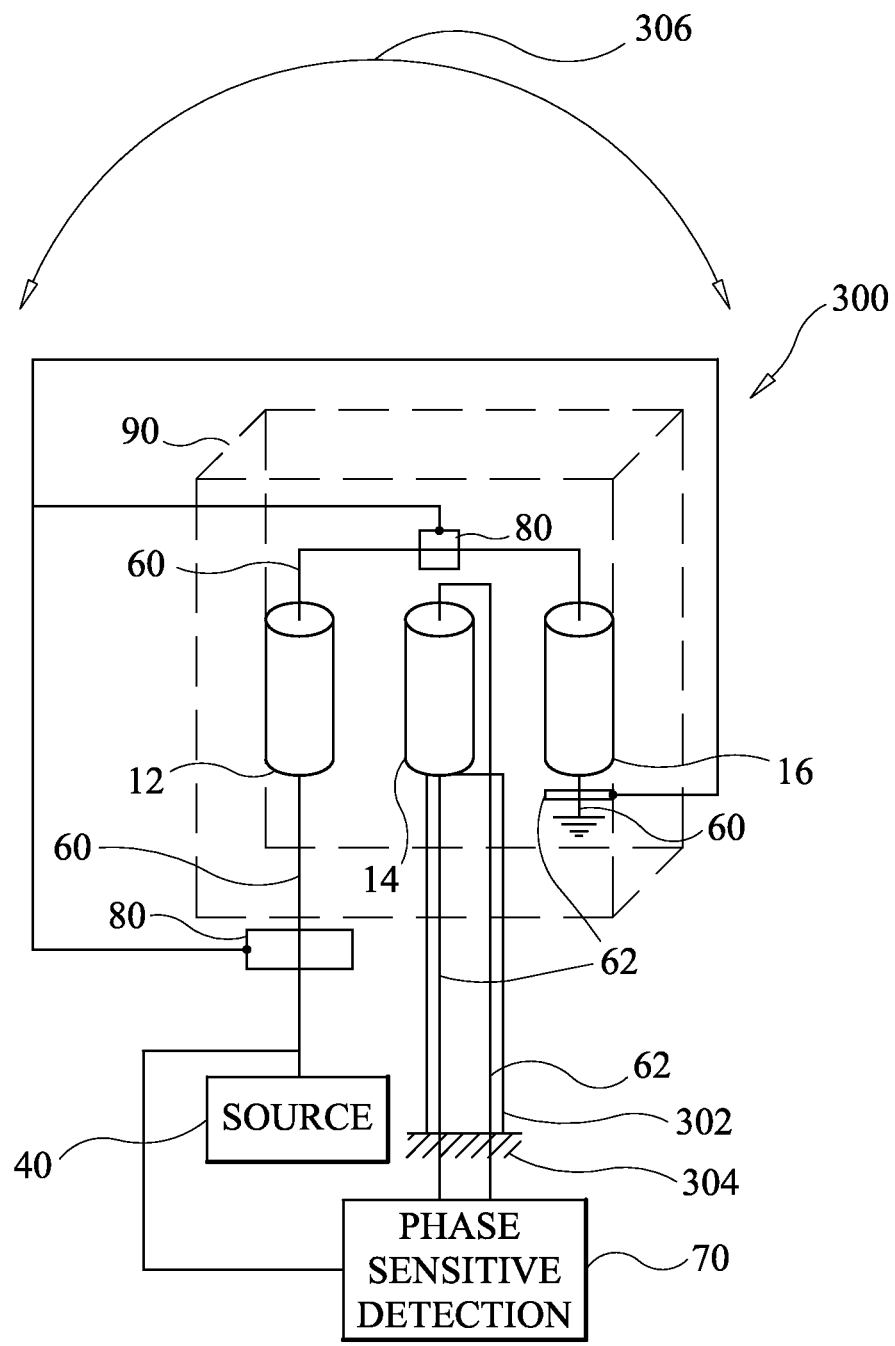
FIG. 6 is a schematic view of an inductive tilt sensor configured with null point compensation in accordance with another embodiment of the present invention.

The present invention can be further adapted to provide a precision tilt sensor. In general, inductive position sensor 100 can be the basis for a tilt sensor when the pick-up inductor is supported by springs or a spring material. Two exemplary embodiments of such a tilt sensor will be described with the aid of FIGS. 5 and 6 where the previously-described elements common with inductive position sensor 100 are indicated using common reference numerals. Referring first to tilt sensor 200 illustrated in FIG. 5, pick-up inductor 14 is supported between drive inductors 12 and 16 by springs 202 and 204. One end of each spring 202 and 204 is coupled to inductor 14, while the other end of each spring is coupled to a fixed support 203 and 205, e.g., a support housing, inductors 12 and 16 that are fixed relative to inductor 14, etc. As sensor 200 is tilted in a plane aligned with inductors 12, 14, and 16 as indicated by two-headed arrow 206, the force of gravity will cause pick-up inductor 14 to move towards one drive inductor or the other thereby producing a signal that indicates the degree of tilt. In FIG. 6, tilt sensor 300 has leads 62 supported on a leaf spring 302 that is fixed at 304. As in the previous example, as sensor 300 is tilted in a plane aligned with inductors 12, 14, and 16 as indicated by two-headed arrow 306, the force of gravity will cause pick-up inductor 14 to move towards one drive inductor or the other thereby producing a signal that indicates the degree of tilt.

The inductive position sensor of the present invention has an inherent third order component that can be used to linearize the output of the tilt sensor. The mathematics of this linearization can be explained as follows. Assume the signal picked up by inductor 14 from one of the drive inductors varies as b/(d+x) where b is a scaling parameter, d is half of the distance between the two drive inductors and x is the distance from the halfway point between the drive inductors. The signal picked up from the other drive inductor varies as −b/(d−x). Adding these and expanding to third order yields an expression for the output voltage of the position sensor $$v = \frac{2b}{d}x + \frac{2b}{d^4}x^3$$

This third order effect has been demonstrated experimentally.

When used as a tilt sensor, the displacement of the center pick-up inductor will vary proportional to sin(t) since this is a component of the force of gravity that is perpendicular to the spring(s). Mathematically $$x = f\sin(t) \approx ft - (f/6)t^3$$

where f incorporates the force of gravity and the spring constant. Substituting the third order expansion shown for x into the equation for v, and only keeping terms to third order yields $$v = \frac{2bf}{d}t + \left(\frac{2bf^3}{d^4} - \frac{bf}{3d}\right)t^3$$

Note that the coefficient to the third order term can be substantially reduced or eliminated by adjusting d or f. For example, the distance between the drive inductors can be adjusted or the pick-up inductor mass or the spring constant can be modified. Such adjustment allows the third order term to be reduced or eliminated to yield a tilt sensor that is linear in angle (not the sine of an angle) out to about ±70 degrees. Without these adjustments, the tilt sensor would only be linear to approximately ±30 degrees.

The advantages of the present invention are numerous. The position sensor and its drive/measurement electronics are simple to design and construct using conventional off-the-shelf components. The sensor's null point compensation features and linear operating range guarantee high precision. The sensors can be adapted to a variety of small-scale and large-scale applications to include those requiring linear position sensing and tilt position sensing.

Although the present invention has been disclosed in terms of a number of preferred embodiments, it will be understood that numerous modifications and variations could be made thereto without departing from the scope of the invention as defined by the following claims.

We claim:

1. An inductive position sensor, comprising:
a first inductor having a first axial core;
a second inductor having a second axial core;
a third inductor having a third axial core;
each of said first axial core, said second axial core, and said third axial core being an independent magnetic structure;
a first support coupled to said first inductor and said second inductor for separating said first inductor and said second inductor by a fixed distance with said first axial core and said second axial core maintained parallel to one another;
a second support coupled to said third inductor for disposing said third inductor between said first inductor and said second inductor with said third axial core maintained parallel to said first axial core and said second axial core;
said first inductor, said second inductor, and said third inductor immersed in a common medium wherein said first inductor, said second inductor, and said third inductor are inductively coupled through said common medium;
said first support and said second support configured for relative movement therebetween wherein said first axial core, said second axial core, and said third axial core remain parallel to one another during said relative movement as distance changes from said third inductor to each of said first inductor and said second inductor;
a first electrical conductor arrangement coupling said first inductor to said second inductor;
a second electrical conductor arrangement coupled to said third inductor;
a source for supplying an oscillating voltage to said first electrical conductor arrangement wherein an oscillating current is supplied to said first inductor and said second inductor and wherein a polarity of said oscillating current supplied to said first inductor is opposite to a polarity of said oscillating current supplied to said second inductor;
a device coupled to said source for measuring a phase component of said oscillating voltage, said device further coupled to said second electrical conductor arrangement for measuring voltage induced in said third inductor when said oscillating current is supplied to said first inductor and said second inductor wherein measurement of said induced voltage is restricted by said device to a phase component of said induced voltage that overlaps said phase component of said oscillating voltage; and
said first electrical conductor arrangement and said second electrical conductor arrangement having fixed capacitance therebetween during said relative movement.

2. An inductive position sensor as in claim 1, wherein said first electrical conductor arrangement is capacitively isolated from said second electrical conductor arrangement.

3. An inductive position sensor as in claim 1, further comprising at least one spring coupled to said third inductor.

4. An inductive position sensor as in claim 3 wherein, when said phase component of voltage induced in said third inductor inherently includes a third order component as a function of its position, a distance between said first inductor and said second inductor and a spring constant of said at least one spring are selected to reduce said third order component.

5. An inductive position sensor as in claim 1, further comprising a spring coupled to said third inductor and said second electrical conductor arrangement.

6. An inductive position sensor as in claim 5 wherein, when said phase component of voltage induced in said third inductor inherently includes a third order component as a function of its position, a distance between said first inductor and said second inductor and a spring constant of said spring are selected to reduce said third order component.

7. An inductive position sensor as in claim 1, further comprising a housing encasing said first inductor, said second inductor, and said third inductor, said housing being made from a magnetic shielding material.

8. An inductive position sensor as in claim 1, wherein at least one of said first inductor, said second inductor, and said third inductor comprises an unshielded inductor.

9. An inductive position sensor as in claim 1, wherein each of said first inductor, said second inductor, and said third inductor comprises an unshielded inductor.

10. An inductive position sensor as in claim 1, wherein said first inductor and said second inductor have the same inductance value.

11. An inductive position sensor as in claim 1, wherein said first inductor, said second inductor, and said third inductor have the same inductance value.

12. An inductive position sensor, comprising:
an unshielded first inductor having a first axial core;
an unshielded second inductor having a second axial core;
an unshielded third inductor having a third axial core;
each of said first axial core, said second axial core, and said third axial core being an independent magnetic structure;
each of said first inductor, said second inductor, and said third inductor having the same inductance value;
a housing encasing said first inductor, said second inductor, and said third inductor, said housing being made from a magnetic shielding material;
a first support coupled to said first inductor and said second inductor for separating said first inductor and said second inductor by a fixed distance with said first axial core and said second axial core maintained parallel to one another;

a second support coupled to said third inductor for disposing said third inductor between said first inductor and said second inductor with said third axial core maintained parallel to said first axial core and said second axial core;

said first inductor, said second inductor, and said third inductor immersed in a common medium wherein said first inductor, said second inductor, and said third inductor are inductively coupled through said common medium;

said first support and said second support configured for relative movement therebetween wherein said first axial core, said second axial core and said third axial core remain parallel to one another during said relative movement as distance changes from said third inductor to each of said first inductor and said second inductor;

a first electrical conductor arrangement coupling said first inductor to said second inductor;

a second electrical conductor arrangement coupled to said third inductor;

a source for supplying an oscillating voltage to said first electrical conductor arrangement wherein an oscillating current is supplied to said first inductor and said second inductor and wherein a polarity of said oscillating current supplied to said first inductor is opposite to a polarity of said oscillating current supplied to said second inductor;

a device coupled to said source for measuring a phase component of said oscillating voltage, said device further coupled to said second electrical conductor arrangement for measuring voltage induced in said third inductor when said oscillating current is supplied to said first inductor and said second inductor wherein measurement of said induced voltage is restricted by said device to a phase component of said induced voltage that overlaps said phase component of said oscillating voltage; and said first electrical conductor arrangement and said second electrical conductor arrangement having fixed capacitance therebetween during said relative movement.

13. An inductive position sensor as in claim 12, wherein said first electrical conductor arrangement is capacitively isolated from said second electrical conductor arrangement.

14. An inductive position sensor as in claim 12, further comprising at least one spring coupled to said third inductor.

15. An inductive position sensor as in claim 14 wherein, when said phase component of voltage induced in said third inductor inherently includes a third order component as a function of its position, a distance between said first inductor and said second inductor and a spring constant of said at least one spring are selected to reduce said third order component.

16. An inductive position sensor as in claim 12, further comprising a spring coupled to said third inductor and said second electrical conductor arrangement.

17. An inductive position sensor as in claim 16 wherein, when said phase component of voltage induced in said third inductor inherently includes a third order component as a function of its position, a distance between said first inductor and said second inductor and a spring constant of said spring are selected to reduce said third order component.

* * * * *